(12) United States Patent
Luce et al.

(10) Patent No.: US 8,070,095 B2
(45) Date of Patent: Dec. 6, 2011

(54) SHRINKING SHOCK STRUT SYSTEM FOR RETRACTABLE LANDING GEAR

(75) Inventors: William E. Luce, Colleyville, TX (US); Adam J. Ditzler, Keller, TX (US)

(73) Assignee: Goodrich Corporation, Charlotte, NC (US)

( * ) Notice: Subject to any disclaimer, the term of this patent is extended or adjusted under 35 U.S.C. 154(b) by 597 days.

(21) Appl. No.: 12/256,204

(22) Filed: Oct. 22, 2008

(65) Prior Publication Data

US 2010/0096499 A1 Apr. 22, 2010

(51) Int. Cl.
*B64C 25/10* (2006.01)
(52) U.S. Cl. .................................................. 244/102 SS
(58) Field of Classification Search ............. 244/102 SS, 244/102 R, 101, 104 FP
See application file for complete search history.

(56) References Cited

U.S. PATENT DOCUMENTS

| | | | | | |
|---|---|---|---|---|---|
| 4,540,142 | A | * | 9/1985 | Veaux et al. | 244/102 R |
| 4,552,324 | A | * | 11/1985 | Hrusch | 244/104 FP |
| 4,630,788 | A | * | 12/1986 | Veaux et al. | 244/104 FP |
| 4,907,760 | A | * | 3/1990 | Sealey et al. | 244/100 R |
| 5,908,174 | A | * | 6/1999 | Churchill et al. | 244/102 SS |

* cited by examiner

*Primary Examiner* — Richard Price, Jr.
(74) *Attorney, Agent, or Firm* — Scott D. Wofsy; Edwards Wildman Palmer LLP

(57) ABSTRACT

A shrinking shock strut system for an aircraft landing gear having a retract actuator that is moveable in length to deploy or retract the landing gear, that includes a shrink strut and a transfer device. The shrink strut may be compressed in length for stowage in the fuselage. The transfer device may be in closed fluid communication with the strut shrink for transferring and receiving hydraulic fluid to and from the strut shrink. When actuated by an aircraft hydraulic system independent of any motion of the retract actuator, the transfer device may drive hydraulic fluid to the strut shrink thereby compressing or shrinking the shrink strut to a partially compressed length.

12 Claims, 7 Drawing Sheets

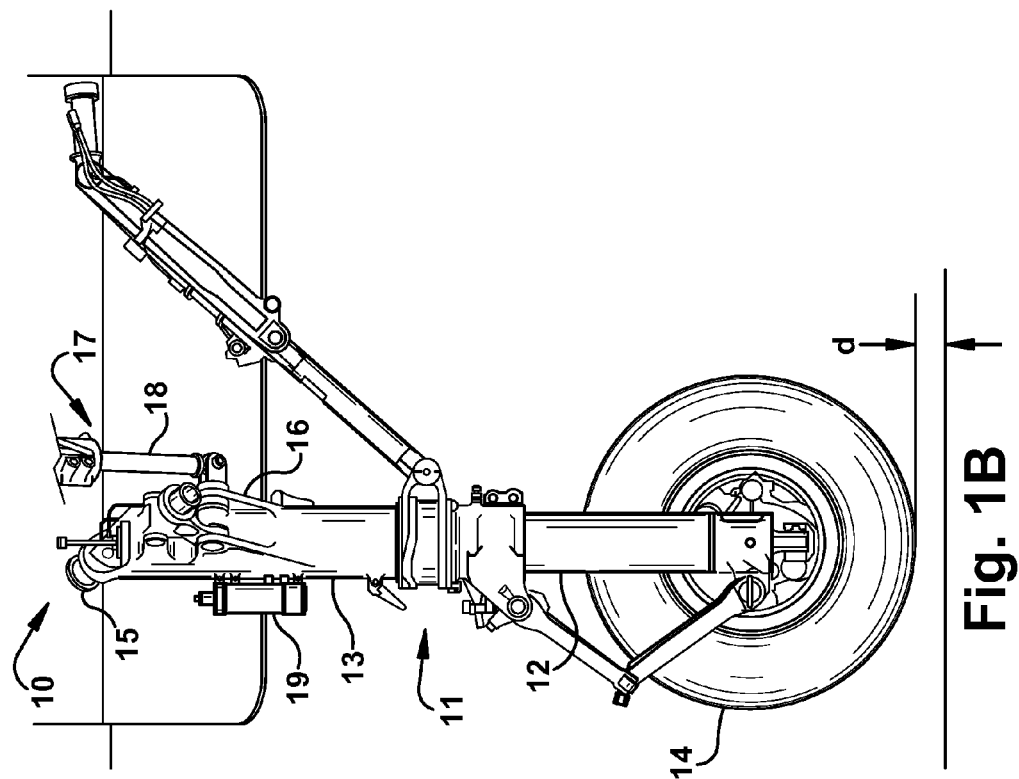
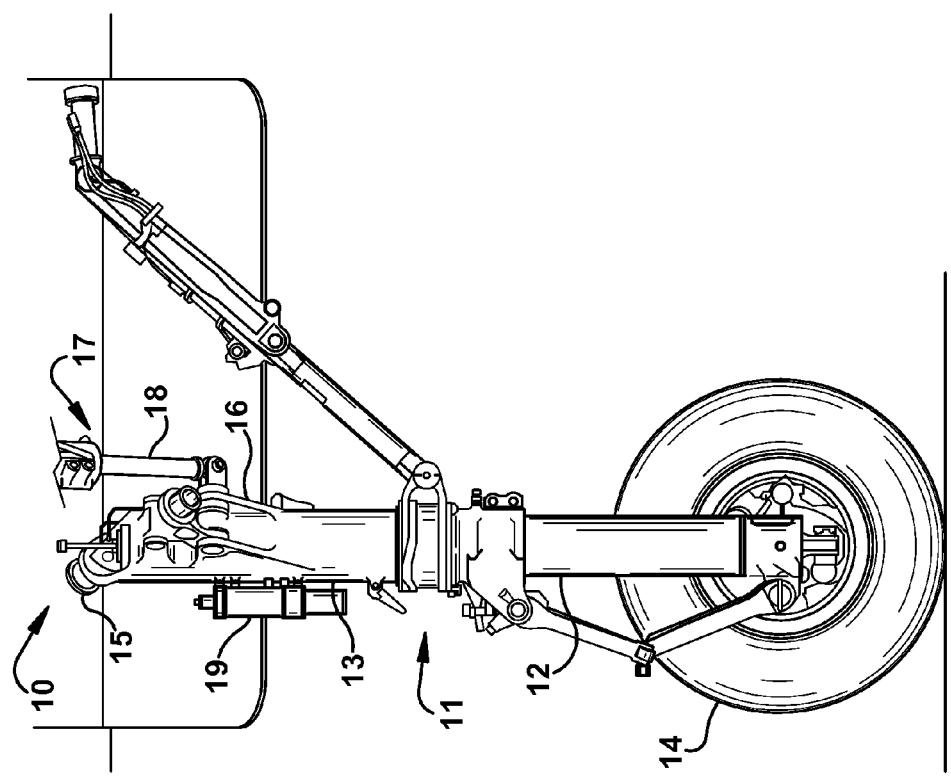

SHRINKING SHOCK STRUT SYSTEM FOR RETRACTABLE LANDING GEAR

FIELD OF THE INVENTION

This invention relates in general to aircraft landing gear, and more particularly, to a shrinking shock strut system that causes a strut to shrink in length independent of the movement of a landing gear actuator that retracts the landing gear into the fuselage of the aircraft.

BACKGROUND

In the design and manufacture of aircraft, it is generally desirable to minimize the space required by aircraft components. One approach to saving space is to shorten the length of the landing gear before or during retraction into a stowed position in the aircraft. The shortened length of the landing gear may be required by the initial design of an aircraft or may be desired to minimize design changes in future generations of an existing aircraft.

A prior art design for shortening the overall length of a strut during retraction is described in U.S. Pat. No. 5,908,174 to Churchill et al. The patent discloses a shrinking shock strut system that automatically shrinks the length of an aircraft landing gear strut during the landing gear's retraction into the aircraft. The shrinking shock strut system includes a hydraulic transfer cylinder that transfers hydraulic fluid into a strut shrink chamber while simultaneously driving pressurized gas from a gas spring chamber of the strut into the hydraulic transfer cylinder. The hydraulic transfer cylinder is physically integrated with a landing gear retract actuator such that a linear motion of a retract actuator effects an equal linear motion of the hydraulic transfer cylinder. In other words, the hydraulic transfer cylinder is mechanically linked to the landing gear retract actuator such that the hydraulic transfer cylinder cannot operate independently from the retract actuator, and thus the extension and shrinking of the landing gear strut is automatically effected during landing gear retraction and deployment. On deployment, a hydraulic lock on the transfer fluid in the strut shrink chamber is removed and the pressurized gas that was transferred to the transfer cylinder drives the transfer fluid from the strut shrink chamber back into the transfer cylinder. As the transfer fluid exits the strut shrink chamber, the pressurized gas returns to the strut from the transfer cylinder and causes the strut to return to its extended length.

Other prior art designs provide a shrink actuator that is independent of the retract actuator but require a heavy and cumbersome mechanical linkage to exert an axial shrinking force on the strut sufficient to overcome the strut's internal pressurized gas bias and cause the strut to shrink. Such designs generally require high hydraulic fluid flow rates that may not be available from the aircraft's high pressure/low flow rate hydraulic system. Such designs may further require a larger landing gear envelope in the fuselage of the aircraft to accommodate the mechanical linkage and the shrink actuator.

SUMMARY OF THE INVENTION

One aspect of the invention provides a shrinking shock strut system for use with aircraft landing gear that have a retract actuator, wherein the shrinking shock strut system operates independently from movement of the retract actuator. The shrinking shock strut system receives its power from an aircraft's hydraulic supply, but maintains a separation between the system's closed hydraulic circuit and the aircraft's hydraulic supply. Using a transfer device to "step-down" the hydraulic pressure, the shrinking shock strut system may provide a higher rate of hydraulic fluid flow to a shrink strut than that available from the aircraft's hydraulic supply. The shrinking shock strut system may be sufficiently compact and avoid the use of heavy mechanical linkage components used solely for shrinking the landing gear.

According to another aspect of the invention, a shrinking shock strut system may be provided for an aircraft landing gear having a retract actuator that is moveable in length to deploy or retract the landing gear that includes a shrink strut and a transfer device. The shrink strut may be moveable between an extended length and a shrunk length, and may include a strut cylinder and a strut piston mounted coaxially, wherein a strut shrink chamber is formed between the strut cylinder and the strut piston, and wherein an increase in the length of the strut shrink chamber causes a decrease in the length of the shrink strut. The system may include a transfer device configured to transfer hydraulic fluid to the strut shrink chamber independent of movement of the retract actuator, and may further include a control device configured to direct aircraft hydraulic fluid to the transfer device to cause it to transfer hydraulic fluid to the strut shrink chamber.

According to another aspect of the invention, the transfer device may include a main cylinder defining a cylindrical chamber and a transfer piston mounted for reciprocal motion within the cylindrical chamber and dividing the cylindrical chamber into a transfer chamber and a supply chamber. The transfer piston may include a transfer pressure area that is in communication with the transfer chamber and a supply pressure area that is in communication with the supply chamber, wherein the transfer pressure area is larger than the supply pressure area.

According to another aspect of the invention, the shrinking shock strut system may use the aircraft's hydraulic supply flow rate in one conduit to drive a higher hydraulic fluid flow rate in a second closed system conduit.

According to another aspect of the invention, the transfer device can hydraulically lock the flow of hydraulic fluid between the transfer device and the strut thereby preventing the strut from returning to its extended length until desired. When commanded, the hydraulic lock on the transfer device can be released and the gas spring pressure of the shrink strut can be used to drive the fluid from the shrink chamber of the strut back into the transfer device.

According to another aspect of the invention, a hydraulic compensator may be provided to maintain a minimum pressure on the hydraulic fluid in the shrinking shock strut system and compensate for volume fluctuations in the hydraulic fluid due to leakage and variations in operating temperature. The compensator also may provide an indication in the event the volume of hydraulic fluid in the system becomes low.

According to another aspect of the invention, a method is provided for conveying hydraulic fluid into the strut for shrinking the strut.

According to another aspect of the invention, the transfer device may include a transfer cylinder including a transfer piston configured with a small effective pressure area on a hydraulic supply side of the transfer piston and a large effective pressure area on a transfer side of the transfer piston. So configured, a small high-pressure flow on the supply side of the transfer piston can drive a large low-pressure flow from the transfer side of the transfer piston through a conduit and into the shrink strut. The transfer piston may be sealed against the inner wall of the transfer cylinder to separate and isolate the aircraft's hydraulic supply fluid from the shrinking shock strut system's volume of transfer fluid. A hydraulic supply and valving mechanism may be provided on the aircraft for supplying and directing hydraulic supply fluid to operate the transfer cylinder.

The foregoing and other features of the invention are hereinafter fully described and particularly pointed out in the claims, the following description, and the annexed drawings setting forth in detail one or more illustrative embodiments of the invention, such being indicative, however, of but one or a few of the various ways in which the principles of the invention may be employed.

BRIEF DESCRIPTION OF THE DRAWINGS

FIGS. 1A and 1B are a pair of elevation views of an exemplary aircraft landing gear in accordance with the invention wherein FIG. 1A shows the landing gear fully extended and FIG. 1B shows the landing gear in a shrunk state.

FIGS. 3A and 3B are a pair of elevation views in cross-section of an exemplary transfer cylinder in accordance with invention wherein FIG. 3A shows the transfer cylinder when the landing gear is in an extended or unshrunk state and FIG. 3B shows the transfer cylinder when the landing gear is in a shrunk state.

FIGS. 5A and 5B are a pair of elevation views in cross-section of a shrink chamber region of the strut of FIG. 4 wherein FIG. 5A shows the strut in an extended or unshrunk state and FIG. 5B shows the strut in a shrunk state.

FIGS. 7A and 7B are a pair of elevation views in cross-section of an exemplary compensator in accordance with the invention wherein FIG. 7A shows the compensator when the shrinking shock strut system is full of fluid and FIG. 7B shows the compensator when the shrinking shock strut system is low on fluid.

DETAILED DESCRIPTION

Figure 2:
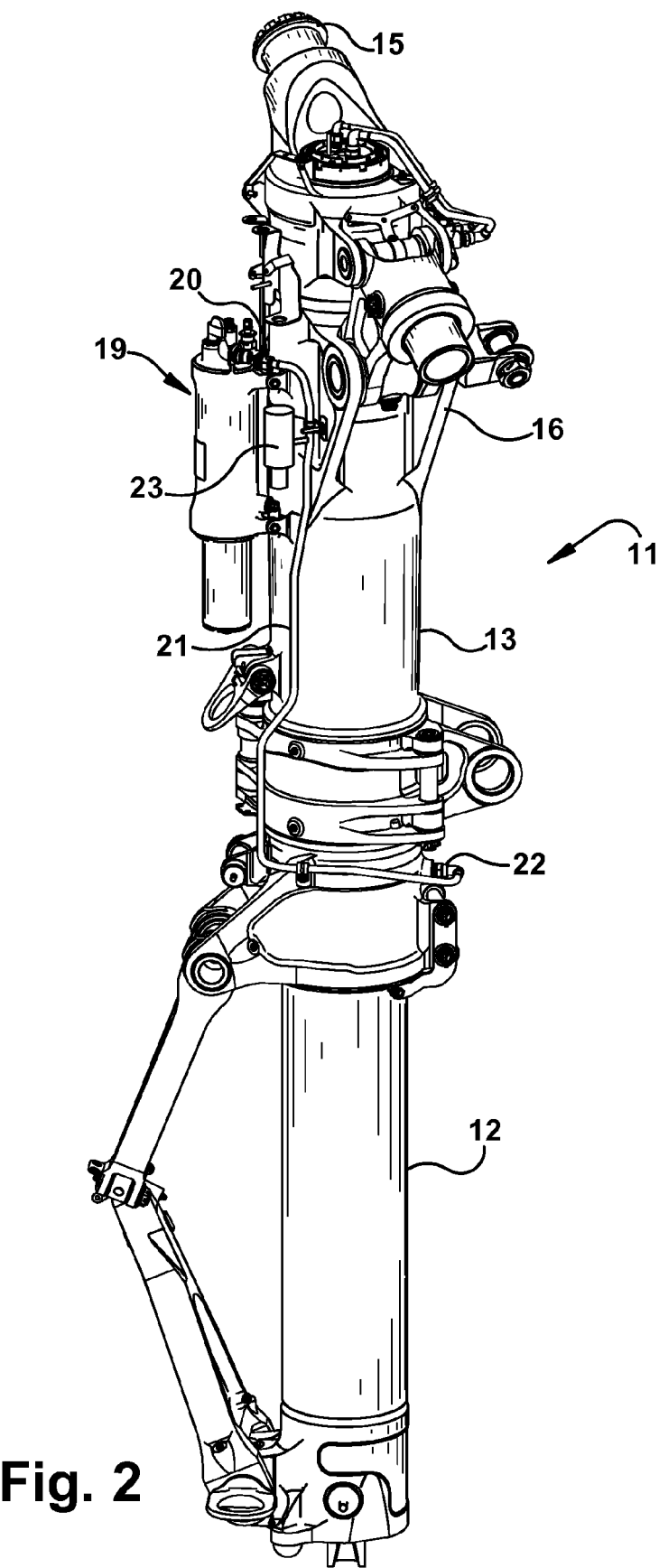
FIG. 2 is an isometric view of an exemplary strut and transfer cylinder in accordance with the invention.

Referring now to the drawings, FIGS. 1A and 1B show an aircraft landing gear 10, depicted in a deployed and extended position in FIG. 1A, and including a strut 11 constructed in accordance with the invention. Landing gear 10 is of the type that attaches to the structure of an aircraft and is moveable between a deployed position and a retracted position. In the retracted position landing gear 10 is housed within the fuselage of the aircraft. One skilled in the art will readily understand that the invention herein disclosed can be adapted for use in conjunction with body mounted or nose mounted landing gear. In addition, the shrinking shock strut system can be included in laterally retracting as well as forward and aft retracting landing gear configurations.

In FIG. 1B, the landing gear 10 is shown in a deployed but shortened or "shrunk" position. In this position, the strut 11 has been shortened in length by a distance "d."

Referring now to FIGS. 1A and 1B in greater detail, landing gear 10 includes a hydropneumatic strut 11 including a strut piston 12 having an upper portion that is telescoped inside an open end of a strut cylinder 13. A wheel 14 is rotatably mounted to a lower portion of the strut piston 12. A trunnion shaft 15 is attached normally to an upper end portion of the strut 11. Each end of the trunnion shaft 15 includes a shaft journal that is rotatably mounted in a bushing attached to the structure of the aircraft. The landing gear 11 pivots about the axis of the trunnion shaft 15 to retract following takeoff and pivots in the opposite manner to deploy before landing the aircraft.

A trunnion clevis 16 extends from the outer diameter of the strut cylinder 13 providing an attachment point for a landing gear actuator 17. The landing gear actuator 17 is pinned at an actuator piston rod 18 extending from a first end to the trunnion clevis 16. A second end of the landing gear actuator 17 is pinned to the structure of the aircraft. Hydraulic fluid is provided by the aircraft to the landing gear actuator 17 to drive the landing gear 10 to the retracted and deployed positions.

To move the landing gear 10 from the deployed position to the retracted position, the landing gear actuator 17 compresses, driving the landing gear 10 about the axis of the trunnion shaft 15 to the retracted position. Before or during landing gear retraction, the strut piston 12 may be driven (by the shrinking shock strut system) into the strut cylinder 13 the distance "d" before the landing gear 10 is fully retracted into the aircraft fuselage. The details concerning the system for driving the strut piston 12 into the strut cylinder 13 are provided below. The landing gear actuator 17 continues to drive the landing gear 10 until it is positioned in the fully retracted position.

To move landing gear 10 from the retracted position to the deployed position, the landing gear actuator 17 extends, driving the landing gear 10 about the axis of the trunnion shaft 15 to the deployed position. Initially, as the landing gear 10 deploys, the strut piston 12 may remain withdrawn within the strut cylinder 13. Once the landing gear 10 clears the aircraft surrounding structure, the strut piston 12 may be driven by the shrinking shock strut system to extend the strut 11 to its fully extended length.

Turning to FIG. 2, the strut 11 of FIGS. 1A and 1B is shown isometrically with a transfer cylinder 19 secured to the strut cylinder 13. The transfer cylinder 19 is in fluid communication with the strut 11 via a transfer port 20 on the transfer cylinder, through a first conduit 21, and into a transfer inlet port 22 on the strut 11. One advantage of the shrinking shock strut system in accordance with the invention is that the transfer cylinder 19 may be located anywhere on the landing gear or aircraft so long as it can maintain fluid communication with the strut 11. A second conduit (not shown) provides fluid communication between the transfer cylinder 19 and the aircraft's hydraulic supply (not shown). Also shown in FIG. 2 is a compensator 23.

Figures 3A, 3B:
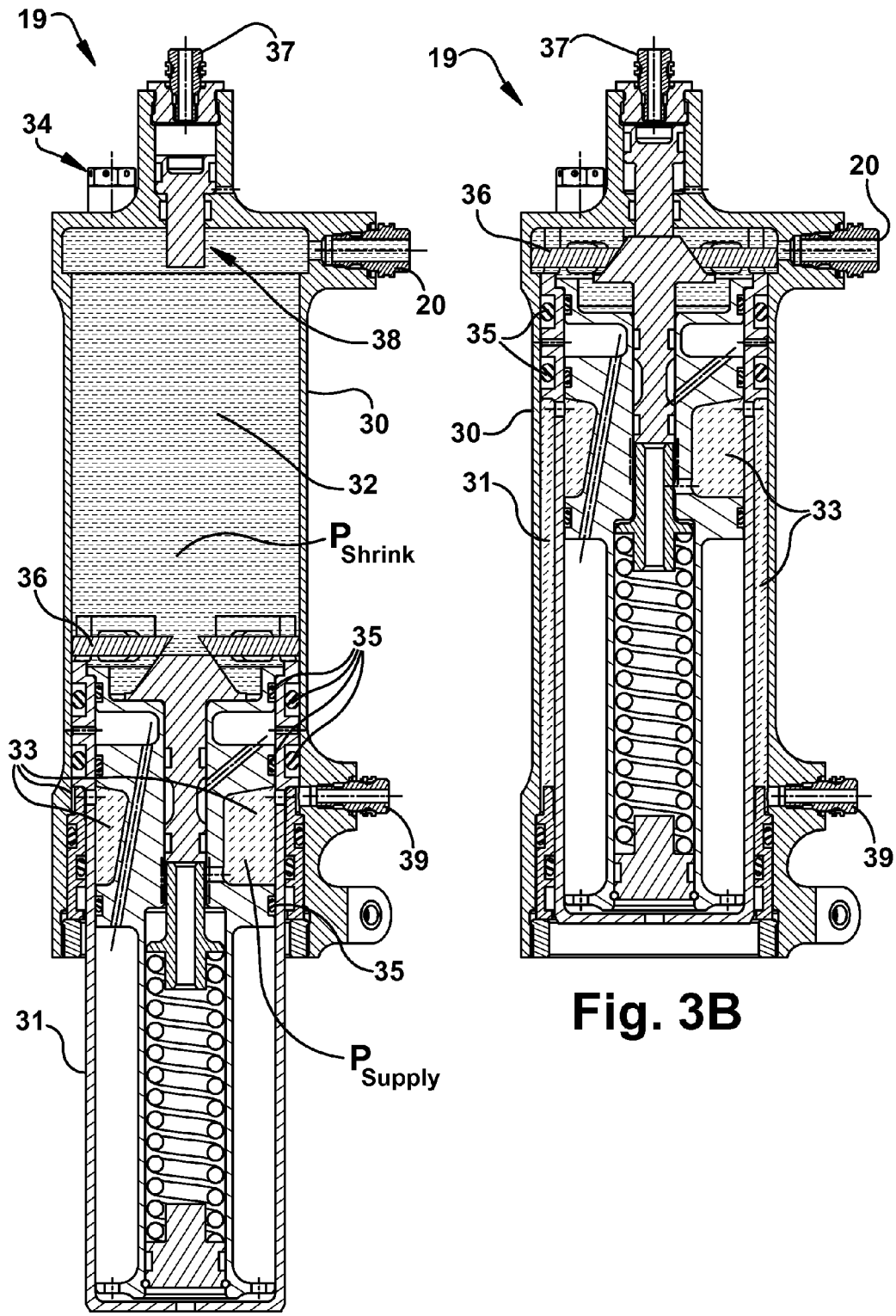

Referring now to FIGS. 3A and 3B, the transfer cylinder 19 is shown in cross section in two states of operation. FIG. 3A shows the transfer cylinder 19 in an extended position that corresponds to the strut 11 in an "un-shrunk" state. FIG. 3B shows the transfer cylinder 19 in a compressed position that corresponds to the strut 11 in a "shrunk and locked" state. Referring to FIG. 3A, the transfer cylinder 19 includes a main cylinder 30 forming a cylindrical chamber therein. A transfer piston 31 is reciprocally disposed within the cylindrical chamber and includes two effective pressure areas, one on each side of the piston. The transfer piston 31 divides the cylindrical chamber into two chambers, namely, a transfer chamber 32 and a supply chamber 33. The transfer chamber 32 may be opened to the atmosphere through a bleed orifice 34, though in operation the transfer chamber 32 is a part of a closed hydraulic circuit and is filled with hydraulic fluid. The supply chamber 33 is a part of a second hydraulic circuit and is filled with hydraulic fluid provided by the aircraft's hydraulic supply. When the hydraulic supply fluid is provided by the aircraft under pressure to the supply chamber 33, the applied pressure acts against the effective pressure area of the transfer piston 31, urging the transfer piston 31 to expand the supply chamber 33 and contract the transfer chamber 32. This motion drives the hydraulic fluid out of the transfer chamber 32 and into the closed hydraulic circuit. Appropriate seals 35 are provided about the transfer piston 31 to maintain a separation of the hydraulic fluids in the transfer chamber 32 and the supply chamber 33, as can be readily appreciated by one skilled in the art.

The transfer chamber 32 is in fluid communication with the strut 11 through the closed hydraulic circuit via the transfer port 20 and a conduit 21 (see FIG. 2). As noted above, when the supply chamber 33 receives hydraulic fluid from the aircraft hydraulic supply, the transfer piston 31 moves to contract the transfer chamber 32 thereby displacing a specific volume of transfer fluid from the transfer chamber 32, through the transfer port 20 and into the strut 11 by way of the conduit 21. FIG. 3B shows the transfer cylinder 19 after the transfer piston 31 has displaced the entire volume of transfer fluid from the transfer chamber 32.

When the transfer piston 31 is positioned within the main cylinder 30 such that it has fully displaced the volume of transfer fluid, a locking mechanism 36 engages to close and lock the transfer piston 31, providing a hydraulic block on the transfer port 20 such that the volume of transfer fluid cannot reenter the transfer chamber 32. The transfer piston 31 is configured to cooperate with the locking mechanism 36 to effect the engagement. Those skilled in the art of actuation locking mechanisms would be able to introduce such a lock and the exemplary system does not depend on any particular variety.

Also shown in FIGS. 3A and 3B is an unlock port 37 located at an upper portion of the main cylinder 30 and adjacent the transfer port 20. The unlock port 37 is in fluid communication with the aircraft's hydraulic power supply via a conduit (not shown). To unlock and open the transfer port 20, a valve (not shown) directs a pressure ($P_{unlock}$) from the aircraft's hydraulic supply to the unlock port 37 to displace an unlocking pin 38 and release the locking mechanism 36.

The supply chamber 33 is in fluid communication with the aircraft's hydraulic supply via a shrink port 39, and a conduit (not shown). The shrink port 39 is located on a portion of the main cylinder 30 opposite the transfer piston 31 from the transfer port 20 such that it is in fluid communication with the supply chamber 33 and not in fluid communication with the transfer chamber 32. The transfer piston 31 and seals 35 separate the transfer chamber 32 from the supply chamber 33 such that they are not in fluid communication. This separation prevents the volume of transfer fluid from entering and affecting the aircraft's hydraulic power supply and prevents the hydraulic power supply from affecting the closed hydraulic circuit of the shrinking shock strut system.

In operation, the transfer cylinder 19 responds to a relatively high pressure and low flow rate hydraulic fluid input from the aircraft's hydraulic system to transfer or provide a lower pressure and higher flow rate hydraulic fluid output to the strut 11 to reduce the length of the strut 11. The aircraft's hydraulic supply applies a pressure ($P_{supply}$) at the shrink port 39 and hydraulic fluid enters into the supply chamber 33. When the effective force applied to the piston 31 from the supply chamber 33 ($P_{supply}$) is greater than an effective force applied to the piston 31 from the transfer chamber 32 ($P_{shrink}$), the transfer piston 31 moves to increase the size of the supply chamber 33 and contract the size of the transfer chamber 32, thereby displacing a volume of transfer fluid through the transfer port 20 and into the strut 11 to shrink it for retraction into the fuselage.

When the landing gear is again deployed, the aircraft's hydraulic supply may reduce the pressure applied at the shrink port 39 (now $P_{return}$) and applies an unlock pressure at the unlock port 37 ($P_{unlock}$) causing the locking mechanism 36 to release, thereby removing the hydraulic block on flow through transfer port 20. If the reduced pressure applied at the shrink port 39 ($P_{return}$) results in an effective force on the piston 31 that is below the effective force applied by a pressure in the closed hydraulic circuit ($P_{gas}$), then the volume of transfer fluid will return to the transfer chamber 32 via the transfer port 20 and return the transfer piston 31 to its original position. The pressures ($P_{return}$) and ($P_{gas}$) are discussed below with reference to FIG. 6.

Figure 4:
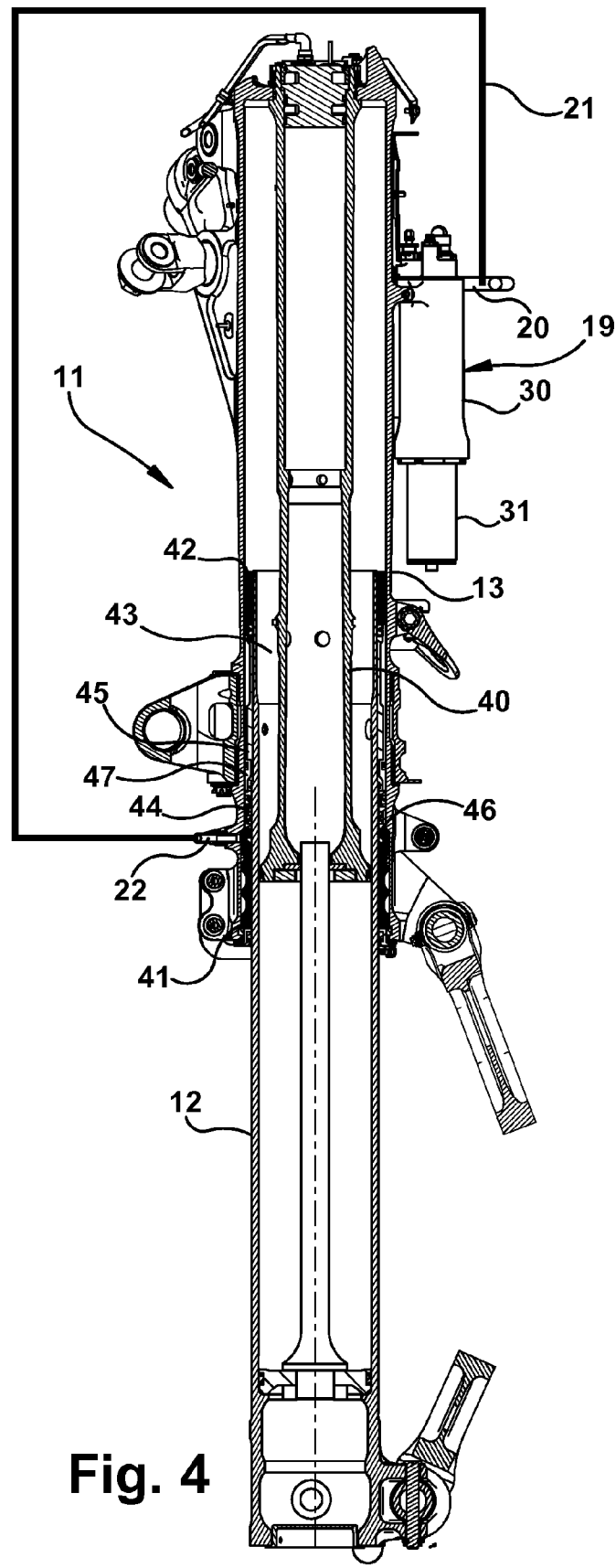
FIG. 4 is an elevation view in cross-section of an exemplary strut in accordance with the invention shown when the landing gear is in an extended or unshrunk state.

Turning now to FIG. 4, a cross-section of the strut 11 is shown in a fully extended position as is the case after takeoff but prior to retraction. As can be seen, the transfer cylinder 19 (shown secured to the strut 11) is in an extended state indicating that the volume of transfer fluid resides in the transfer chamber 32. The strut piston 12 is reciprocally received within the strut cylinder 13 in a concentric relationship with and between the strut cylinder 13 and an orifice support tube 40. A lower strut bearing 41 is received within the open end of the strut cylinder 13 against which the strut piston 12 slides. An upper strut bearing 42 is attached to the end portion of the strut piston 12 within the strut cylinder 13 sliding against its interior. A gas spring chamber 43 is formed within the interior section of the cylinder 13, piston 12, and capped by the lower strut bearing 41. The gas spring chamber 43 is pressurized with gas at a pressure ($P_{gas}$), which varies with the temperature and degree of insertion of the strut piston 12 into the strut cylinder 13. A shrink piston 44 and a set of spacers 45 are disposed between the interior bore of the strut cylinder 13, the strut piston 12, the upper strut bearing 42, and the lower strut bearing 41, allowing the strut piston 12 to extend a predetermined distance. At full strut extension, the upper strut bearing 42, shrink piston 44, a set of spacers 45, and lower strut bearing 41 are forced into contact due to the bias caused by the gas pressure ($P_{gas}$) within the gas spring chamber 43.

A strut shrink chamber 46 is formed between the shrink piston 44, the strut cylinder 13, the strut piston 12, and the lower bearing 41. The strut shrink chamber 46 is in fluid communication with the transfer inlet port 22 and is filled with hydraulic fluid. In FIG. 4 the strut 11 is shown unshrunk. In this state, the shrink chamber 46 has a minimum volume. The shrink chamber 46 is in fluid communication with the transfer chamber 32 of the transfer cylinder 19 via a conduit 21 (shown schematically) and the volume of transfer fluid may be transferred from the transfer chamber 32 to the shrink chamber 46 when the transfer chamber force on the shrink piston 44 exceeds the force applied to the opposite side of the shrink piston 44 (resulting from $P_{gas}$ and other externally applied forces).

The gas spring pressure of the strut 11 varies with the compression of the piston 12 into the cylinder 13, as in the case when the aircraft lands or is taxiing across the airfield. In such a case, the pressurized gas in the gas spring chamber 43 is further compressed as the strut 11 absorbs the energy of the loads exerted upon it. The shrink piston 44 may remain in contact with the lower strut bearing 41 and a rebound chamber 47 is established between the upper strut bearing 42 and the shrink piston 44. As the strut piston 12 again extends, the fluid in the rebound chamber 47 slows the piston 12 extension rate with increased pressure which is exerted against the shrink piston 44 keeping it in contact with the lower bearing 41.

Figure 5B:
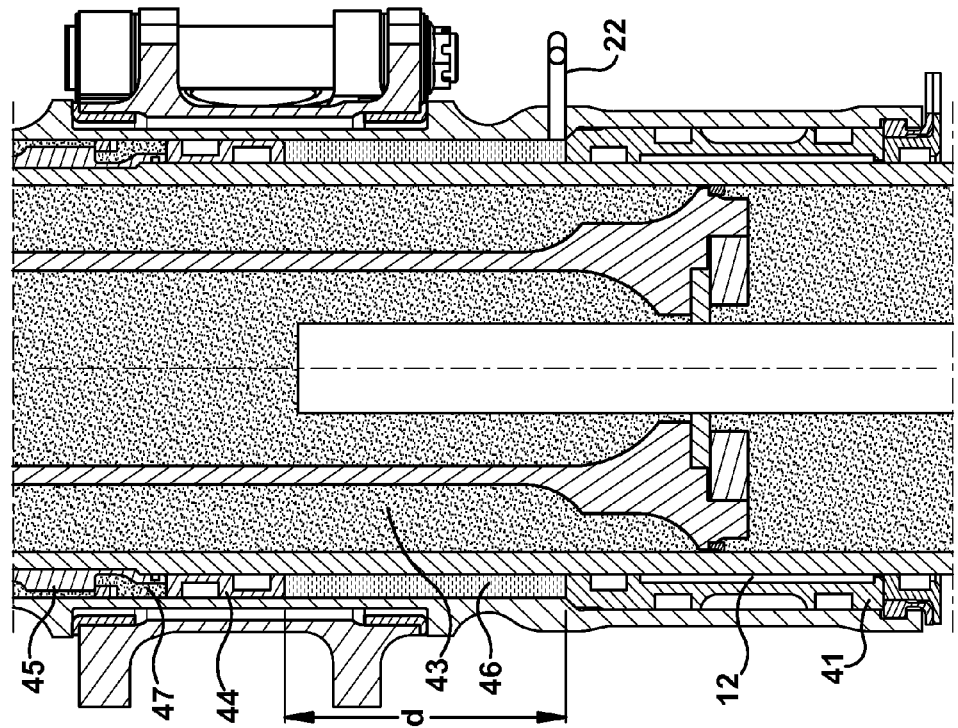
Figure 5A:
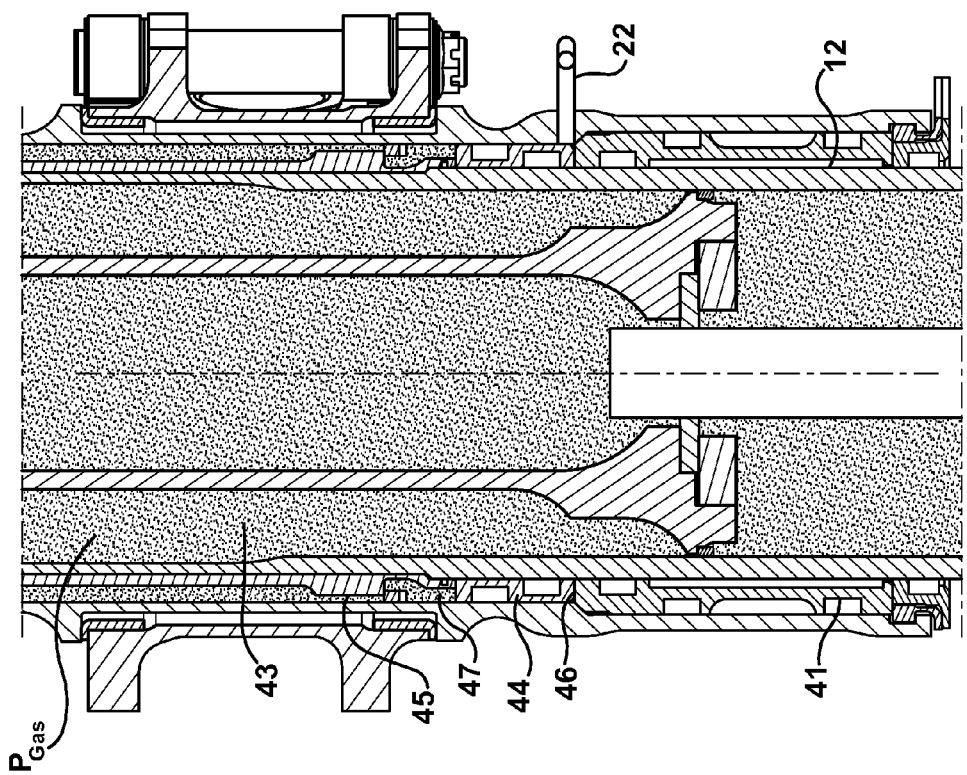

Turning to FIGS. 5A and 5B, detailed cross-sectional views of the strut 11 are shown in two states: unshrunk (FIG.

5A) and shrunk (FIG. 5B). In FIG. 5A, the shrink piston 44 is shown disposed between the lower bearing 41 and the rebound chamber 47. In response to the movement of the transfer piston 31, the volume of hydraulic fluid in the transfer chamber 32 flows through the transfer inlet port 22 into the strut shrink chamber 46. The fluid pressure in the strut shrink chamber 46 is sufficient to force the shrink piston 44, spacers 45, upper strut bearing 42, and strut piston 12 to withdraw into the strut cylinder 13 a distance "d."

FIG. 5B illustrates a fully shrunk state wherein the shrink chamber 46 has expanded to accommodate the volume of transfer fluid transferred from the transfer chamber 32. As mentioned previously, once the transfer piston 31 has displaced the volume of fluid from the transfer chamber 32, the locking mechanism 36 is engaged thus locking transfer piston 31 which blocks flow through transfer port 20 such that the volume of transfer fluid is hydraulically "locked" in the shrink chamber 46.

Figure 6:
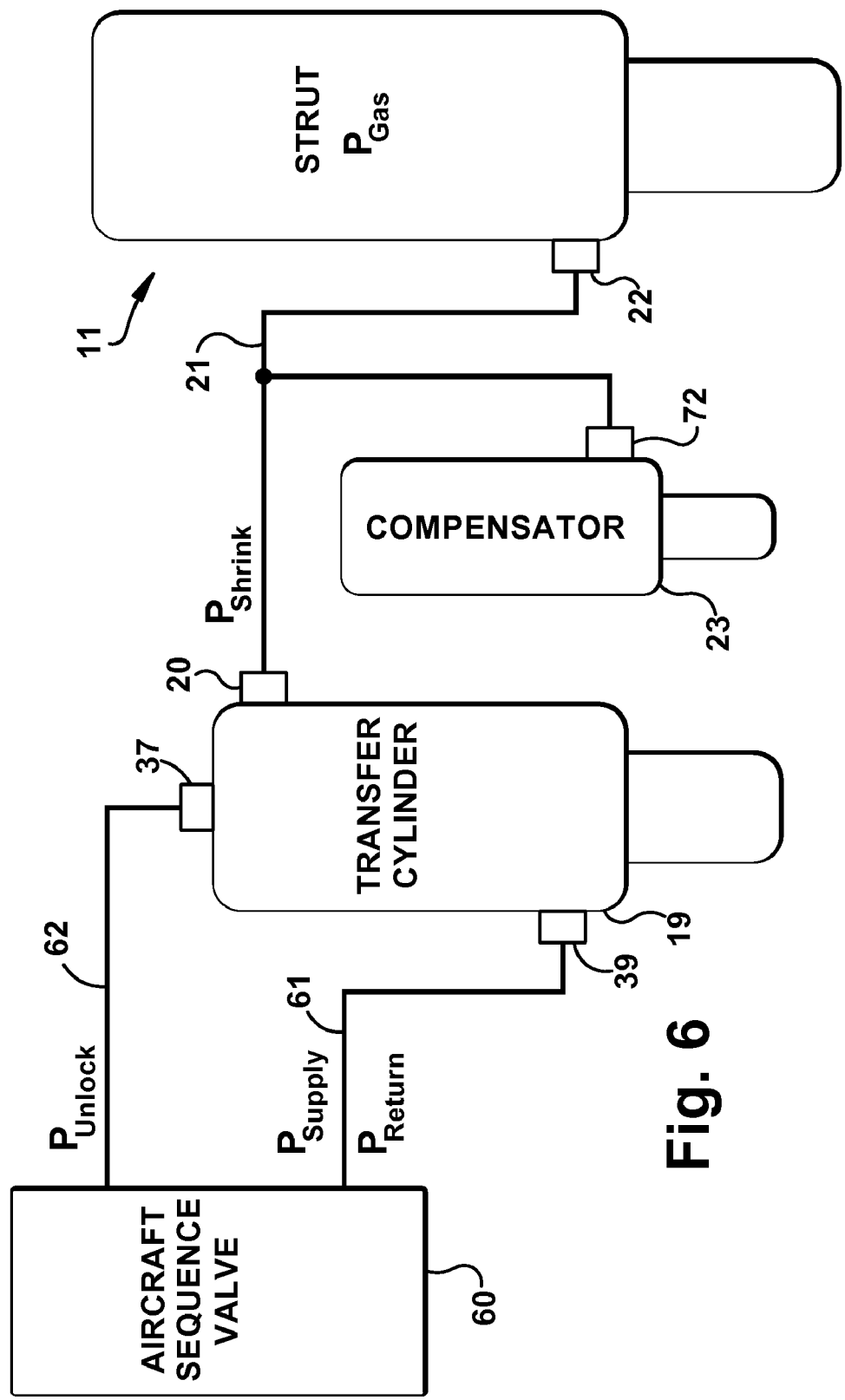
FIG. 6 is a schematic hydraulic diagram of an exemplary landing gear shrinking shock strut system in accordance with the invention for shrinking a single landing gear.

Turning now to FIG. 6, a control device such as an exemplary aircraft sequence valve 60 commands the aircraft's hydraulic supply to (1) shrink the strut 11 and independently (2) retract the landing gear 10. The sequence valve 60 which directs hydraulic supply pressure and return pressure to the transfer cylinder 19 is in fluid communication with the supply chamber 33 of the transfer cylinder 19 through a conduit 61 and supply port 39. The sequence valve 60 is also in fluid communication with the locking mechanism 36 through a conduit 62 and unlock port 37. As noted above, the conduit 21 provides fluid communication between the strut shrink chamber 46 and the transfer chamber 32. An appropriate hydraulic supply system (not shown) including, for example, a hydraulic pump and fluid reservoir, is necessary to supply the sequence valve 60. While the example of sequence valve 60 is shown and described, control devices are well known in the art and the invention is not dependent on the use of any particular control device.

In accordance with the invention, the shrinking shock strut system is controlled independently of the landing gear actuator 17. It is noted, however, that the sequence valve 60 may operate the shrinking shock strut system described herein before or during landing gear retraction and may return the strut to its original length during or after landing gear deployment.

Applying a numerical example to the schematic in FIG. 6, an aircraft hydraulic supply may be provided at a relatively high pressure (e.g., 4000 psi) but with a relatively low flow rate (e.g., 3.0 GPM) available. Such a low flow rate may not provide the volume of flow required to fill the shrink chamber 46 of the strut 11 in a given period of time between the pilot's input and the landing gear's retraction into the fuselage of the aircraft. When, however, the high supply pressure is provided to the transfer cylinder 19, it acts on a small effective pressure area of the transfer piston 31. The opposing side of the transfer piston 31 has a much larger effective area and—when the piston 31 is in motion—it drives a much larger transfer fluid flow rate (e.g., 6.5 GPM per landing gear—13 GPM for left and right landing gear) from the transfer chamber 32 at a lower pressure (e.g., less than 2000 psi). For returning the strut 11 to its unshrunk or extended length, the aircraft sequence valve 60 ensures that the supply shrink pressure ($P_{supply}$) is removed or reduced ($P_{return}$), and further applies an unlocking pressure ($P_{unlock}$) via conduit 62 to the unlock port 37. This combination of inputs operates to release the locking mechanism 36 and unblock flow through transfer port 20 to allow the gas spring pressure ($P_{gas}$) of the strut to drive the shrink piston 44 to contract the shrink chamber 46 and return the volume of transfer fluid to the transfer chamber 32.

The shrinking shock strut system in accordance with the invention relies on transferring a specific volume of transfer fluid from the transfer chamber 32 to the shrink chamber 46. Compressibility and in-service temperature variations may affect the effective fluid volume in the system. To compensate for such fluctuations, the compensator 23 is added to the system's hydraulic schematic shown in FIG. 6. The compensator 23 provides an additional volume of fluid to the system to compensate for the factors listed above and further maintains a nominal pressure on the fluid in the conduits of the system and provides an indication when the fluid level in the system becomes low and maintenance is required.

Figure 7A:
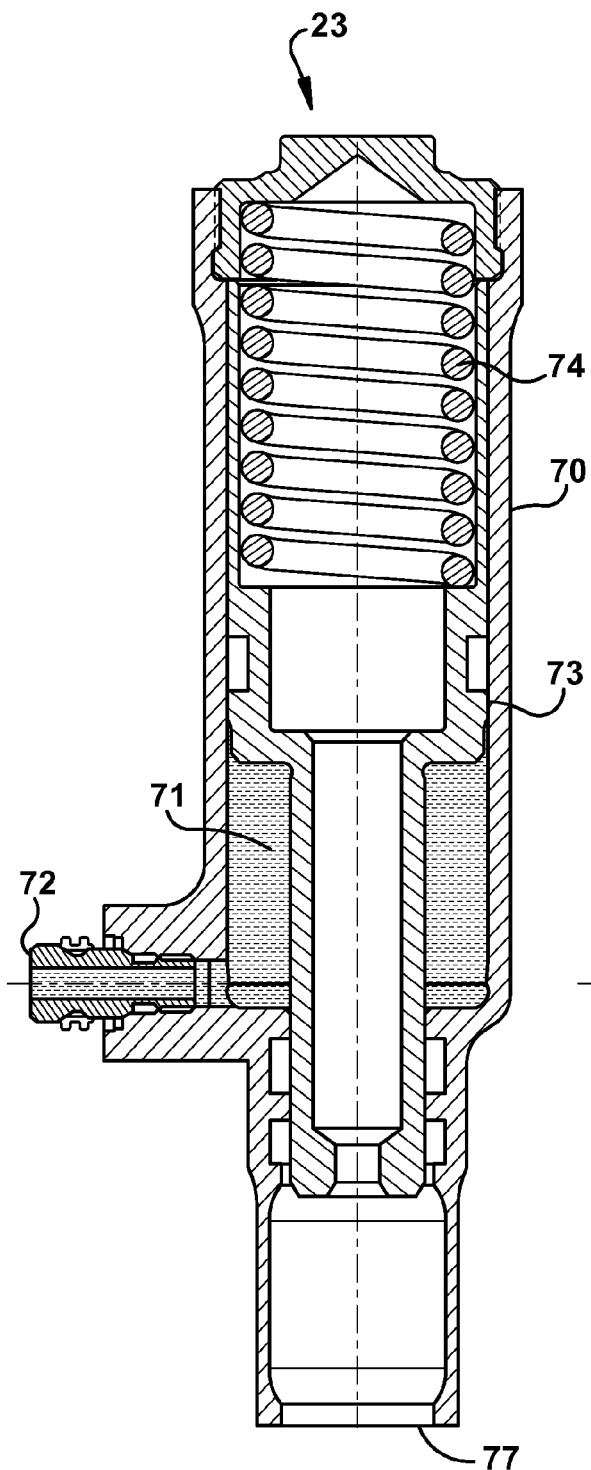
Figure 7B:
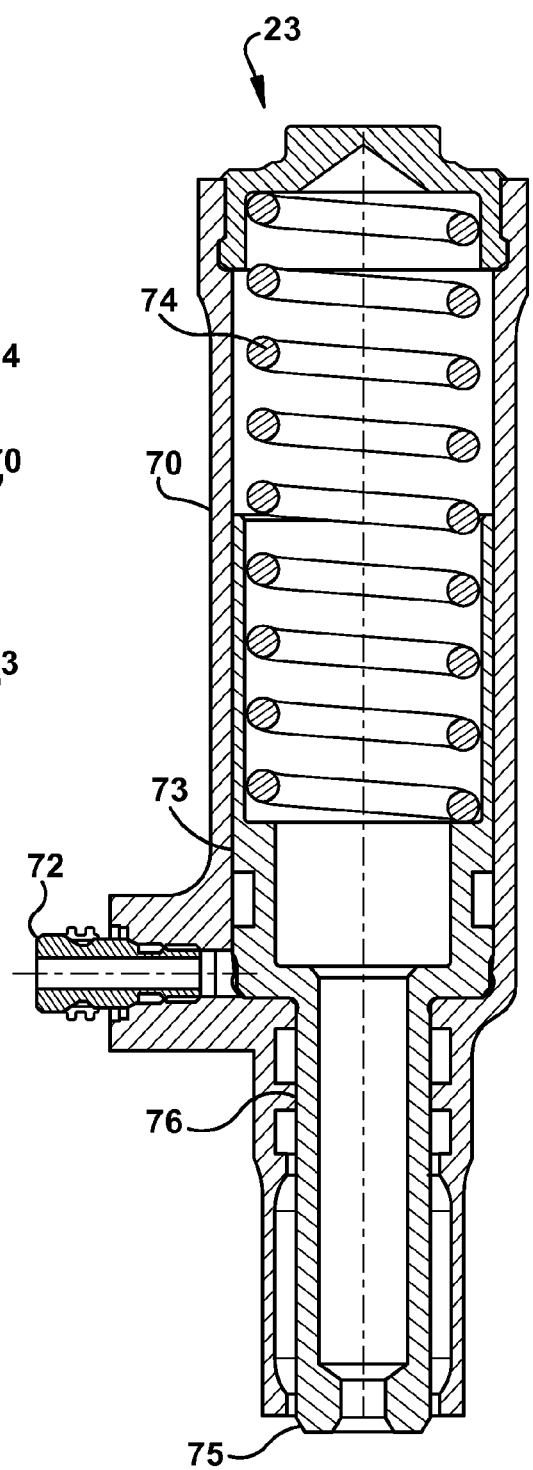

Turning to FIGS. 7A and 7B, an exemplary compensator 23 is shown in cross-section in two states of operation. FIG. 7A shows the compensator 23 when it is full of hydraulic fluid. FIG. 7B shows the compensator 23 when the shrinking shock strut system is low on hydraulic fluid. The compensator 23 includes a main cylinder 70 that forms a cylindrical cavity having two ends. At a first end of the cavity is a fluid chamber 71 that is in fluid communication with the shrinking shock strut system's hydraulic circuit via a port 72. Between the fluid chamber 71 and a second end of the cylindrical cavity is a piston 73 that maintains a seal against an interior wall of the cylindrical cavity. On a side of the piston 73 opposite the fluid chamber 71 is a spring 74 exerting a preloaded bias force against piston 73 for maintaining a nominal pressure on the fluid in the fluid chamber 71. In the example shown the spring is a mechanical coil spring. Any spring, however, that provides a bias force against the piston 73 and thus a pressure in the fluid in the fluid chamber 71 may be used. Examples include a compressed gas spring or a different mechanical spring configuration.

In the example shown in FIGS. 7A and 7B, the compensator 23 also includes a low fluid visual indicator 75 by way of adding an extension 76 to the piston 73 that extends through an orifice 77 at the first end of the cylindrical cavity when the spring 74 pushes the piston 73 through the fluid chamber 71. The presence of the indicator 75 through the orifice 77 indicates that the fluid chamber 71 is marginally filled or empty. This visual indication provides the aircraft maintenance crew a simple check as to whether the shrinking shock strut system has lost fluid or otherwise requires maintenance. A sensor could also be added to provide an electronic indication to a maintenance computer along with (or instead of) the visual indication.

It is further noted that the exemplary compensator 23 may be packaged and located anywhere in the aircraft, the transfer cylinder 19, or the strut 11.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A shrinking shock strut system for an aircraft landing gear having a retract actuator that is moveable in length to deploy or retract the landing gear, comprising:
   a shrink strut that is moveable between an extended length and a shrunk length, the shrink strut including a strut cylinder and a strut piston mounted coaxially, wherein a variable length strut shrink chamber is formed between the strut cylinder and the strut piston, and wherein an increase in the length of the strut shrink chamber causes a decrease in the length of the shrink strut;
   a transfer device configured to transfer hydraulic fluid to the strut shrink chamber independent of movement of the retract actuator;
   a control device configured to cause the transfer device to transfer hydraulic fluid to the strut shrink chamber; and
   a pressure compensator and wherein the strut shrink chamber, the transfer device, and the pressure compensator are in communication with a closed hydraulic system, wherein the pressure compensator is configured to maintain a minimum pressure in the closed hydraulic system.

2. The shrinking shock strut system according to claim 1, wherein the transfer device comprises:
   a main cylinder defining a cylindrical chamber therein; and
   a transfer piston mounted for reciprocal motion within the cylindrical chamber and dividing the cylindrical chamber into a transfer chamber and a supply chamber;
   wherein the transfer piston comprises a transfer pressure area that is in communication with the transfer chamber and a supply pressure area that is in communication with the supply chamber; and
   wherein the transfer pressure area is larger than the supply pressure area.

3. The shrinking shock strut system according to claim 1, wherein the pressure compensator is further configured to provide additional hydraulic fluid to the closed hydraulic system to account for variations in fluid volume.

4. The shrinking shock strut system according to claim 1, wherein the pressure compensator comprises:
   a chamber configured to store hydraulic fluid under pressure,
   a piston configured to apply pressure to hydraulic fluid stored in the chamber,
   a spring configured to exert a biasing force on the piston, and
   an opening providing communication between the chamber and the closed hydraulic system configured for providing and receiving hydraulic fluid from the closed hydraulic system.

5. The shrinking shock strut system according to claim 1, wherein the pressure compensator comprises a low fluid indicator.

6. The shrinking shock strut system according to claim 1, wherein a control device comprises a valve for directing aircraft hydraulic supply fluid to the transfer device.

7. The shrinking shock strut system according to claim 1, wherein the transfer device comprises a piston having a supply side and a transfer side, and wherein an effective pressure area on the supply side is smaller than an effective pressure area on the transfer side.

8. A shrinking shock strut system for an aircraft landing gear having a retract actuator that is moveable in length to deploy or retract the landing gear, comprising:
   a shrink strut that is moveable between an extended length and a shrunk length, the shrink strut including a strut cylinder and a strut piston mounted coaxially, wherein a variable length strut shrink chamber is formed between the strut cylinder and the strut piston, and wherein an increase in the length of the strut shrink chamber causes a decrease in the length of the shrink strut;
   a transfer device configured to transfer hydraulic fluid to the strut shrink chamber independent of movement of the retract actuator, wherein the transfer device includes a main cylinder defining a cylindrical chamber therein and a transfer piston mounted for reciprocal motion within the cylindrical chamber and dividing the cylindrical chamber into a transfer chamber and a supply chamber, wherein the transfer piston includes a transfer pressure area that is in communication with the transfer chamber and a supply pressure area that is in communication with the supply chamber, and wherein the transfer pressure area is larger than the supply pressure area;
   a control device configured to cause the transfer device to transfer hydraulic fluid to the strut shrink chamber;
   a first conduit configured to establish closed fluid communication between the transfer chamber and the strut shrink chamber; and
   a second conduit configured to establish fluid communication between the supply chamber and an aircraft hydraulic system.

9. The shrinking shock strut system according to claim 8, wherein the transfer device further comprises a locking mechanism.

10. The shrinking shock strut system according to claim 9, wherein the locking mechanism is configured to hydraulically lock the hydraulic fluid in the first conduit.

11. The shrinking shock strut system according to claim 10, further comprising a third conduit configured to establish fluid communication between the locking mechanism and an aircraft hydraulic system.

12. The shrinking shock strut system according to claim 8, further configured to provide a higher fluid flow rate to the strut shrink chamber through the first conduit than the fluid flow rate it receives from the aircraft supply through the second conduit.

* * * * *